(12) United States Patent
Verón et al.

(10) Patent No.: US 9,681,292 B2
(45) Date of Patent: Jun. 13, 2017

(54) METHOD FOR HANDLING CIPHERING KEYS IN A MOBILE STATION

(75) Inventors: Christian Herrero Verón, Lund (SE); Monica Wifvesson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1119 days.

(21) Appl. No.: 13/388,890

(22) PCT Filed: Aug. 17, 2010

(86) PCT No.: PCT/IB2010/002038
§ 371 (c)(1),
(2), (4) Date: Feb. 28, 2012

(87) PCT Pub. No.: WO2011/021091
PCT Pub. Date: Feb. 24, 2011

(65) Prior Publication Data
US 2012/0163601 A1    Jun. 28, 2012

Related U.S. Application Data

(60) Provisional application No. 61/234,489, filed on Aug. 17, 2009, provisional application No. 61/331,003, filed on May 4, 2010.

(51) Int. Cl.
*H04W 12/04* (2009.01)
*H04W 12/02* (2009.01)

(52) U.S. Cl.
CPC ........... *H04W 12/04* (2013.01); *H04W 12/02* (2013.01); *H04L 2463/061* (2013.01)

(58) Field of Classification Search
CPC .. H04W 12/04; H04W 12/02; H04L 2463/061
See application file for complete search history.

(56) References Cited

U.S. PATENT DOCUMENTS

| | | | |
|---|---|---|---|
| 5,586,185 A * | 12/1996 | Shibata et al. | 380/264 |
| 9,344,924 B2 * | 5/2016 | Wu | H04W 36/0033 |
| 2002/0071558 A1* | 6/2002 | Patel | 380/270 |

(Continued)

OTHER PUBLICATIONS

Vrentzos et al. "Hardware implementation of the A5/3 & A5/4 GSM encryption algorithms." (2006).*

(Continued)

*Primary Examiner* — Kari Schmidt
(74) *Attorney, Agent, or Firm* — Coats & Bennett, PLLC (57) ABSTRACT

Techniques for handling ciphering keys in a mobile station comprising a mobile equipment (ME) and a Universal Subscriber Identity Module (USIM) are disclosed. An example method includes obtaining a UMTS cipher key (CK), integrity key (IK), and ciphering key sequence number (CKSN) from the USIM, deriving a 128-bit ciphering key (Kc-128) from the CK and the IK, and storing the Kc-128 and the CKSN on the mobile equipment, separate from the USIM. The stored CKSN is associated with the stored Kc-128, so that the Kc-128's correspondence to the most current UMTS security context can be tracked. This example method applies to the generation and storage of a 128-bit ciphering key for either the packet-switched or circuit-switched domains. A corresponding user equipment apparatus is also disclosed.

22 Claims, 4 Drawing Sheets

(56) References Cited

U.S. PATENT DOCUMENTS

| | | | | |
|---|---|---|---|---|
| 2005/0176431 A1* | 8/2005 | Herrero Veron | ........ | H04L 63/06 455/436 |
| 2006/0039553 A1* | 2/2006 | Suen | ........ | H04L 9/065 380/28 |
| 2009/0093249 A1* | 4/2009 | Zhu | ........ | H04W 8/06 455/433 |
| 2010/0008507 A1* | 1/2010 | Galante et al. | ........ | 380/278 |
| 2011/0135095 A1* | 6/2011 | Zhang | ........ | H04L 12/6418 380/272 |
| 2012/0198227 A1* | 8/2012 | Brusilovsky | ........ | H04W 12/04 713/150 |

OTHER PUBLICATIONS

Z. Ahmadian, S. Salimi and A. Salahi, "New attacks on UMTS network access," 2009 Wireless Telecommunications Symposium, Prague, 2009, pp. 1-6.*

Koien, Geir M. "An introduction to access security in UMTS." IEEE Wireless Communications 11.1 (2004): 8-18.*

Balderas-Contreras, Tomás, and René Cumplido. "High performance encryption cores for 3G networks." Proceedings of the 42nd annual Design Automation Conference. ACM, 2005.(pp. 240-243).*

3rd Generation Partnership Project. "Technical Specification Group Services and System Aspects; 3G Security; Security Architecture (Release 8)". 3GPP TS 33.102 V8.3.0, Jun. 2009, Sophia-Antipolis, France.

3rd Generation Partnership Project. "Technical Specification Group Services and System Aspects; 3GPP System Architecture Evolution (SAE): Security Architecture (Release 8)." 3GPP TS 33.401 V8.4.0, Jun. 2009, Sophia-Antipolis, France.

European Telecommunications Standards Institute, "Digital cellular telecommunications system (Phase 2+); Universal Mobile Telecommunications System (UMTS); LTE; Mobile radio interface Layer 3 specification; Stage 3 (3GPP TS 24.008 version 8.6.0 Release 8)", Technical Specification, ETSI TS 124 008 V8.6.0, Jul. 1, 2009, pp. 1-583, ETSI.

Ericsson, et al. "Derivation of Kc128 with UMTS AKA", 3GPP TSG SA WG3 Security—S3#56, Seattle, US, 33.102 Change Request 208, S3-091520, Jul. 10, 2009, pp. 1-20, 3GPP.

European Telecommunications Standards Institute, "Digital cellular telecommunications system (Phase 2+); 3G Security; Specification of the A5/4 Encryption Algorithms for GSM and ECSD, and the GEA4 Encryption Algorithm for GPRS (3GPP TS 55.226 version 10.0.0 Release 10)", Technical Specification, ETSI TS 155 226 V10.0.0, May 1, 2011, pp. 1-8, ETSI.

European Telecommunications Standards Institute, "Digital cellular telecommunications system (Phase 2+); 3G Security; Specification of the A5/4 Encryption Algorithms for GSM and ECSD, and the GEA4 Encryption Algorithm for GPRS (3GPP TS 55.226 version 9.0.0 Release 9)", Technical Specification, ETSI TS 155 226 V9.0.0, Feb. 1, 2011, pp. 1-8, ETSI.

European Telecommunications Standards Institute, "Digital cellular telecommunications system (Phase 2+); 3G Security; Specification of the A5/4 Encryption Algorithms for GSM and ECSD, and the GEA4 Encryption Algorithm for GPRS (3GPP TS 55.226 version 11.0.0 Release 11)", Technical Specification, ETSI TS 155 226 V11.0.0, Nov. 1, 2012, pp. 1-8, ETSI.

3rd Generation Partnership Project, "Technical Specification Group GSM/EDGE Radio Access Network; Mobile radio interface layer 3 specification; Radio Resource Control (RRC) protocol (Release 8)," 3GPP TS 44.018 V8.3.0, May 2008, pp. 1-401.

3rd Generation Partnership Project, "Technical Specification Group Core Network; Mobile Station—Serving GPRS Support Node (MS-SGSN); Logical Link Control (LLC) layer specification; (Release 8)", 3GPP TS 44.064 V8.0.0, Dec. 2008, pp. 1-63.

3rd Generation Partnership Project, "Technical Specification Group Services and system Aspects; Security related network functions (Release 8)", 3GPP TS 43.020 V8.0.0, Dec. 2008, pp. 1-109.

* cited by examiner

METHOD FOR HANDLING CIPHERING KEYS IN A MOBILE STATION

RELATED APPLICATIONS

This application claims priority to U.S. Provisional Patent Application Ser. No. 61/234,489, filed 17 Aug. 2009 and titled "Introduction of 128-bit ciphering key for A5/4 and GEA/4," and U.S. Provisional Patent Application Ser. No. 61/331,003, filed 4 May 2010 and titled "Improvements to 3GPP Technical Specification 24.008."

FIELD OF THE INVENTION

The present invention relates generally to ciphering in wireless communication systems, and more particularly relates to techniques for handling ciphering keys in UMTS mobile stations.

BACKGROUND

Members of the $3^{rd}$-Generation Partnership Project (3GPP) are currently developing Release 9 improvements to the family of standards for the Universal Mobile Telecommunications System (UMTS). As part of this work, new encryption algorithms have been introduced, including the A5/4 algorithm for GSM circuit-switched services and the GEA4 for GSM GPRS (packet-switched) services. These algorithms are defined in the 3GPP document 3GPP TS 55.226, "3G Security; Specification of the A5/4 Encryption Algorithms for GSM and ECSD, and the GEA4 Encryption Algorithm for GPRS." As specified in that document, the new encryption algorithms A5/4 and GEA4 each require a full 128-bit ciphering key.

A key derivation function to derive a 128-bit ciphering key (Kc-128) in the mobile equipment and in the network has been defined in the 3GPP document 3GPP TS 33.102, "3G security; Security architecture," for Release 9. The Kc-128 is derived from the UMTS security keys (i.e., the ciphering key, CK, and the integrity key, IK), which are associated with the corresponding 64-bit GSM ciphering key in the current setting. Therefore, since the UMTS security keys are needed to derive the 128-bit key, the user must have a Universal Subscriber Identity Module (USIM) in use in the user equipment (UE) and the network needs to initiate the UMTS AKA (authentication) procedure towards the UE, in order to be able to use the encryption algorithms A5/4 and GEA4 for GSM and GSM GPRS services.

3GPP TS 33.102 has also specified that the Kc-128 is stored only in the mobile equipment (ME) and not in the USIM, and that this ciphering key is deleted when the ME is powered down as well as when the USIM is removed from the UE.

Figure 7:
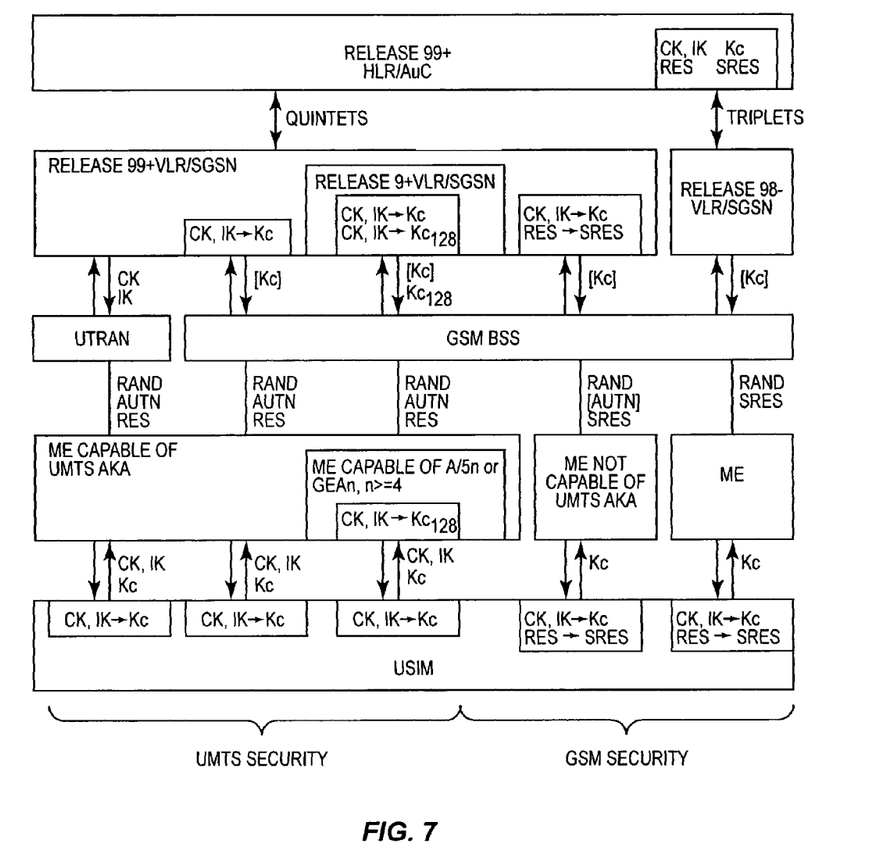
FIG. 7 illustrates key agreement scenarios in UMTS and GSM networks.

FIG. 7 is taken from 3GPP TS 33.102, and illustrates the scenarios in which a Kc-128 is derived from CK and IK by the ME and network. While the 3GPP specifications outline the basis usage scenarios for the Kc-128, complete analysis and specification of the handling of the Kc-128 by the ME has not been performed prior to the development of the present invention.

SUMMARY

Techniques for handling ciphering keys in a mobile station comprising a mobile equipment (ME) and a Universal Subscriber Identity Module (USIM) are disclosed. An example method includes obtaining a UMTS cipher key (CK), integrity key (IK), and ciphering key sequence number (CKSN) from the USIM, deriving a 128-bit ciphering key (Kc-128) from the CK and the IK, and storing the Kc-128 and the CKSN on the mobile equipment, separate from the USIM. The stored CKSN is associated with the stored Kc-128, so that the Kc-128's correspondence to the most current UMTS security context can be tracked. This example method applies to the generation and storage of a 128-bit ciphering key for either the packet-switched or circuit-switched domains.

In some embodiments, the obtaining, deriving, and storing steps discussed above are performed in response to a determination that a ciphering algorithm requiring a 128-bit ciphering key is to be taken into use. In others, these steps are performed in response to determining that a new UMTS security context has been established. In still others, these steps are performed at the same time as or in response to determining that a 64-bit ciphering key is generated.

In various embodiments, the stored Kc-128 is applied to a 128-bit ciphering algorithm in response to determining that the ciphering algorithm is to be taken into use. In some of these embodiments, the validity of the stored Kc-128 is verified by obtaining a most recent CKSN from the USIM and comparing the most recent CKSN to the stored CKSN to verify a match, prior to applying the stored Kc-128 to the ciphering algorithm. In some of these embodiments, if the most recent CKSN does not match the stored CKSN, then the ME obtains a new UMTS cipher key (CK), new integrity key (IK), and new ciphering key sequence number (CKSN) from the USIM, derives a new Kc-128 from the new CK and the new IK, and stores the new Kc-128 and the new CKSN on the mobile equipment.

In some embodiments, more than one Kc-128 may be stored on the ME. Thus, some embodiment include the steps of obtaining a new CK, new IK, and new CKSN from the USIM, deriving a new Kc-128) from the new CK and the new IK, and storing the new Kc-128 and the new CKSN on the mobile equipment, in addition to the previously stored Kc-128 and CKSN. In these embodiments, the ME is configured to track the Kc-128 that corresponds to the most recent successful UMTS authentication and key agreement process. Upon determining that a ciphering algorithm requiring a 128-bit ciphering key is to be activated, some of these embodiments are configured to overwrite the previously stored Kc-128 and CKSN with the new Kc-128 and new CKSN.

The stored CKSN may become invalid under a number of circumstances. In response to determining that the CKSN is invalid, various embodiments are configured to delete the stored CKSN. The determination that the stored CKSN is invalid may result from detecting that the corresponding CKSN on the USIM has been or is to be deleted, detecting that the update status on USIM for circuit-switched services is changed to "U2 NOT UPDATED," "U3 ROAMING NOT ALLOWED," or "U4 UPDATING DISABLED," detecting that the update status on USIM for packet-switched services is changed to "GU2 NOT UPDATED" or "GU3 ROAMING NOT ALLOWED," or detecting that the USIM has been disabled.

Mobile station apparatus corresponding generally to the methods summarized above are also disclosed, and include processing circuits configured to carry out one or more of the key-handling techniques described herein. Of course, those skilled in the art will appreciate that the present invention is not limited to the above features, advantages, contexts or examples, and will recognize additional features and advantages upon reading the following detailed description and upon viewing the accompanying drawings

DETAILED DESCRIPTION

Various embodiments of the present invention are now described with reference to the drawings, wherein like reference numerals are used to refer to like elements throughout. In the following description, numerous specific details are set forth for purposes of explanation, in order to provide a thorough understanding of one or more embodiments. It may be evident to one of ordinary skill in the art, however, that one or more embodiments of the present invention may be implemented or practiced without one or more of these specific details. In other instances, well-known structures and devices are shown in block diagram form in order to facilitate describing one or more embodiments.

While the techniques and solutions described herein are described generally in the context of the application of the A5/4 and GEA4 ciphering algorithms, those skilled in the art will appreciate that additional new encryption algorithms may be supported in UMTS and/or GSM networks in future. The techniques described herein are intended to support these new encryption algorithms and the present invention is thus not limited to the use of these already specified algorithms.

Several of the embodiments are described herein in connection with a radio access terminal, which communicates wirelessly with fixed base stations in the wireless network. The radio access terminal can also be called a system, subscriber unit, subscriber station, mobile station, mobile, remote station, remote terminal, mobile device, user terminal, terminal, wireless communication device, user agent, or user device, and is commonly referred to as user equipment (UE) in the 3GPP specifications. An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. In the context of UMTS-capable terminals, a complete UE comprises a mobile equipment (ME) coupled to a Universal Subscriber Identity Module (USIM).

Figure 1:
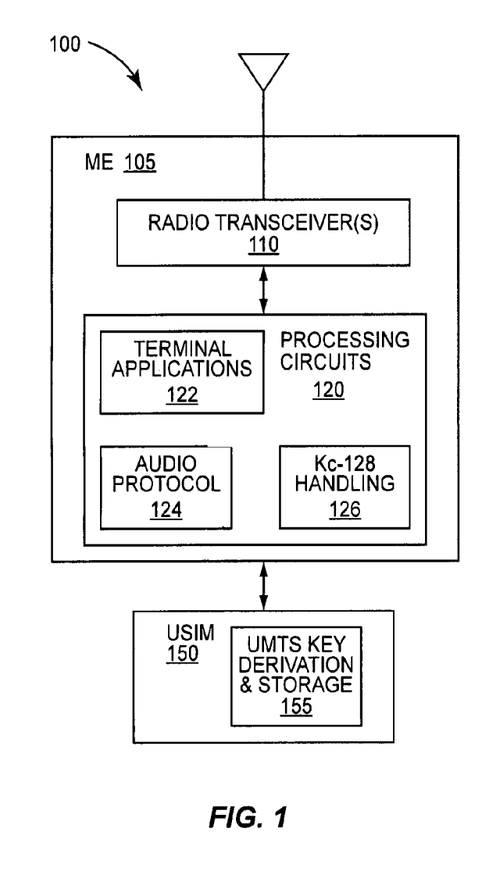
FIG. 1 illustrates a user equipment, including a mobile equipment (ME) and Universal Subscriber Identity Module (USIM), according to some embodiments of the present invention.

One such UE 100 is illustrated in FIG. 1; UE 100 comprises ME 105 and USIM 150. ME 105 comprises one or more radio transceivers 110, each configured for operation in one or more frequency bands according to one or more particular wireless standards such as GSM, GPRS, EDGE, W-CDMA, HSPA, etc. ME 105 further comprises processing circuits 120, which in turn may include one or several microprocessors, microcontrollers, digital signal processors, and the like, configured with appropriate firmware and/or software. As shown in FIG. 1, these processing circuits 120 are configured for one or more terminal applications, which may include, for example, user interface-related programs for allowing a user to operate the device, personal information management programs, multimedia applications, etc. The processing circuits are also configured to carry out one or more radio protocols 124, which control the UE's communications with base stations according to one or more wireless telecommunication standards. Finally, the ME 105 includes a Kc-128 handling application 126, the details of which will be described more fully below.

Figure 2:
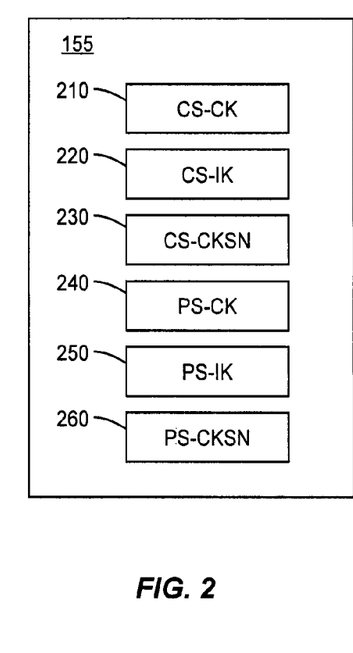
FIG. 2 illustrates the storing of a Universal Mobile Telecommunications System (UMTS) security context in the USIM, for each of the circuit-switched and packet-switched domains.

USIM 150 includes, inter alia, a UMTS key derivation and storage function 155. During a UMTS authentication and key agreement (AKA) process, the USIM and the network agree on a 128-bit cipher key known as CK, as well as a 128-bit integrity key known as IK. These keys, along with a ciphering key sequence number (CKSN), make up a UMTS security context. (Note that in the UMTS context, the CKSN is sometimes called the key set identifier, or KSI. The term CKSN is used herein.) A separate UMTS security context may be obtained for each of the circuit-switched (CS) domain and the packet-switched (PS) domain. Thus, as shown in FIG. 2, the UMTS key derivation and storage function 155 may include a circuit-switched domain cipher key (CS-CK) 210, a circuit-switched domain integrity key (CS-IK) 220, a circuit-switched domain CKSN (CS-CKSN) 230, a packet-switched domain cipher key (PS-CK) 240, a packet-switched domain integrity key (PS-IK) 250, and a packet-switched domain CKSN (CS-CKSN) 260. At various times, depending on the activities the UE 100 is engaged in, and depending on the configuration of the supporting network, one, both, or neither of these UMTS security contexts may exist in the USIM 150.

As noted above, a key derivation function to derive a 128-bit ciphering key (Kc-128) in the ME and in the network has been defined in the 3GPP TS 33.102 for Release 9. The Kc-128 is derived from the UMTS security keys CK and IK. Prior to the addition of 128-bit encryption algorithms to the standards, the use of CK and IK to generate a 64-bit GSM ciphering key has already been standardized. Because the UMTS security keys are needed to generate the 128-bit ciphering key Kc-128, the UE obviously is required to be coupled to a USIM, with an active UMTS security context, in order to begin the use of either of the encryption algorithms A5/4 and GEA4 in the network.

FIG. 7 is taken from 3GPP TS 33.102, and illustrates the scenarios in which a Kc-128 is derived from CK and IK by the ME and network. While the 3GPP specifications outline the basis usage scenarios for the Kc-128, complete analysis and specification of the handling of the Kc-128 by the ME has not been performed prior to the development of the present invention.

So far, 3GPP TS 33.102 has specified that the Kc-128 is stored only in the mobile equipment (ME) and not in the USIM. In order to allow the ME to determine whether a particular Kc-128 is still valid, the stored Kc-128 should be associated with a CKSN, which is also stored in the ME. Thus, in both of the circuit-switched and packet-switched domains, the CKSN provided by the network to the ME during the UMTS AKA procedure is linked to any derived Kc-128 bit ciphering key, as well as to any corresponding 64-bit ciphering key. As a result, at any given time an ME may store a Kc-128 and an associated CKSN (and Kc-64) for the circuit-switched domain, a Kc-128 and associated CKSN (and Kc-64) for the packet-switched domain, both, or neither.

For security reasons, the Kc-128 (for either or both domains, as applicable) is deleted when the ME is powered down, as well as when the USIM is removed from the UE. However, these are not the only scenarios in which the Kc-128 should be deleted. In both the circuit-switched and packet-switched domains, whenever the CKSN of the corresponding UMTS security context is deleted, the linked Kc-128 bit ciphering key, if exists, is deleted from the ME as well. In addition, both the CKSN and associated Kc-128 (for either or both domains, as applicable) should be deleted when the USIM is removed from the device or when the USIM's operation is disabled (e.g., by user command).

Furthermore, a UMTS security context may be invalidated under certain circumstances. Accordingly, in the circuit-switched domain, the ME shall delete any Kc-128 ciphering key for circuit-switched services stored in the ME when the update status on USIM for circuit switched services is changed to "U2 NOT UPDATED", "U3 ROAMING NOT ALLOWED," or "U4 UPDATING DISABLED," as result of a Non-Access Stratum (NAS) signaling procedure such as a Location Area Update procedure, Authentication Failure, CM service reject. Likewise, in the packet-switched domain, the ME shall delete any Kc-128 ciphering key when the update status on the USIM for GPRS services is changed to "GU2 NOT UPDATED," or "GU3 ROAMING NOT ALLOWED," as a result of a NAS signaling procedure such as GPRS Attach, NW initiated Detach, Authentication procedure or Routing Area Update procedure.

An ME with a USIM in use shall apply the Kc-128 bit ciphering key for circuit-switched services when, in A/Gb mode, an A5 ciphering algorithm (or other algorithm) that requires a 128-bit ciphering key is taken into use. Likewise, an ME with a USIM in use shall apply the Kc-128 bit ciphering key for GPRS when, in A/Gb mode, a GEA ciphering algorithm (or other algorithm) that requires a 128-bit ciphering key is taken into use. In either case, the Kc-128 that is applied when the use of a 128-bit ciphering algorithm is begun should always be based on the most recent successful UMTS authentication procedure. The actual generation of the Kc-128 (for either the CS or PS domains) from the CK and the IK can be at any of several times, however.

For example, the Kc-128 for the circuit-switched or packet-switched domain can be generated:
- the first time when the key is actually needed for use (e.g., the first time 128-bit encryption for a particular UMTS security context for the circuit-switched or packet-switched domain is activated);
- every time the key is actually needed for use (i.e., every time 128-bit encryption is activated for the circuit-switched or packet-switched domain);
- when the Kc-64 bit ciphering key for a given domain is derived by the USIM or provided to the ME by the USIM;
- when the Kc-64 bit ciphering key for a given domain is first put into use (i.e., the first time 64-bit encryption for a particular UMTS security context for circuit-switched or packet-switched domain is activated); or
- as soon as a UMTS security context for a given domain is established (i.e., upon completion of the authentication procedure for UMTS AKA).

Upon derivation of a new Kc-128 for either domain, the ME should generally overwrite the existing Kc-128 bit ciphering key for that domain with the newly derived Kc-128 bit ciphering key. However, as will be discussed in further detail below, some implementations of the ME may provide for the storage of two Kc-128 ciphering keys for each domain—a first one corresponding to the key currently in active use, and a second one corresponding to the most recently completed authentication and key agreement procedure. In such implementations, care must be taken to ensure that the proper key is taken into use upon initiation of a 128-bit encryption algorithm, and that a stored Kc-128 ciphering key is overwritten or marked when it is no longer valid.

Figure 3:
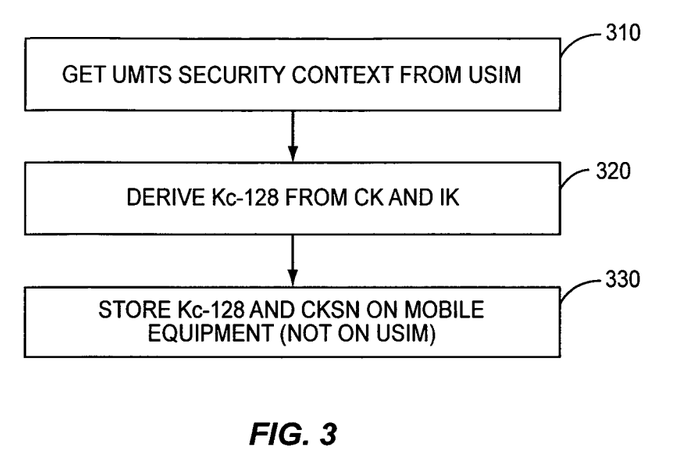
FIG. 3 is a process flow diagram illustrating a method for handling ciphering keys in a mobile station comprising a mobile equipment and a USIM.

FIG. 3 is a process flow diagram illustrating a general method for handling ciphering keys in a mobile station comprising an ME and a USIM. As shown at block 310, the method begins with the obtaining of the current UMTS security context for the circuit-switched context or packet-switched context from the USIM. This includes the cipher key CK, the integrity key IK, and the cipher key sequence number CKSN. The Kc-128 for the given domain is derived from CK and IK, as shown at block 320, using the key derivation function specified in 3GPP TS 33.12 for Release 9. As indicated at block 330, the derived Kc-128 is then stored on the ME (not in the USIM), in association with the CKSN.

Figure 4:
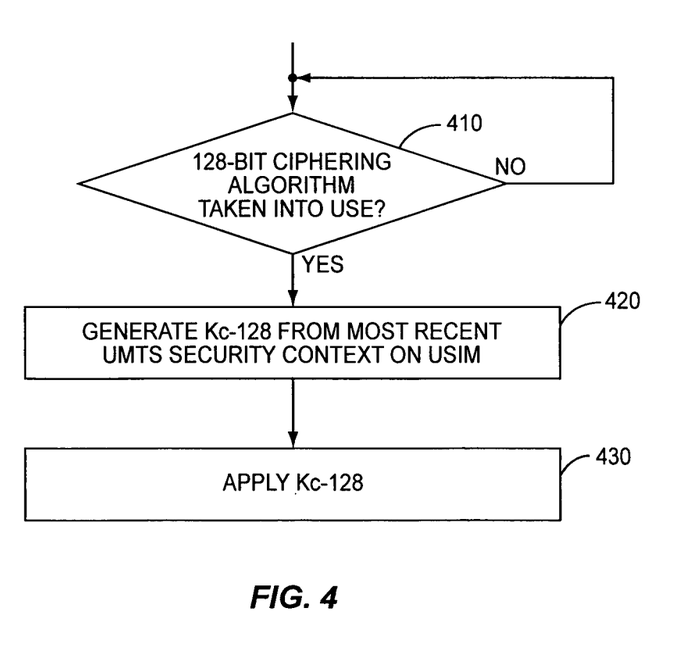
FIG. 4 is another process flow diagram illustrating a method for handling ciphering keys, in which the Kc-128 is derived in response to determining that a 128-bit ciphering algorithm is taken into use.

As noted above, the generation of the Kc-128 for a given domain can take place at any of several times. One approach is illustrated in FIG. 4. In this approach, the derivation of a Kc-128 for a given domain is triggered by an indication that an algorithm requiring the 128-bit ciphering key is to be taken into use. Thus, as shown at block 410, the ME determines that a GSM Ciphering algorithm or GPRS ciphering algorithm requiring a Kc-128 is being taken into use. If so, then the Kc-128 is generated from the most recent UMTS security context stored on the USIM, as shown at block 420. (This generation is as shown in FIG. 3.) Then, the newly derived Kc-128 is applied to the indicated ciphering algorithm, as shown at block 430.

Figure 5:
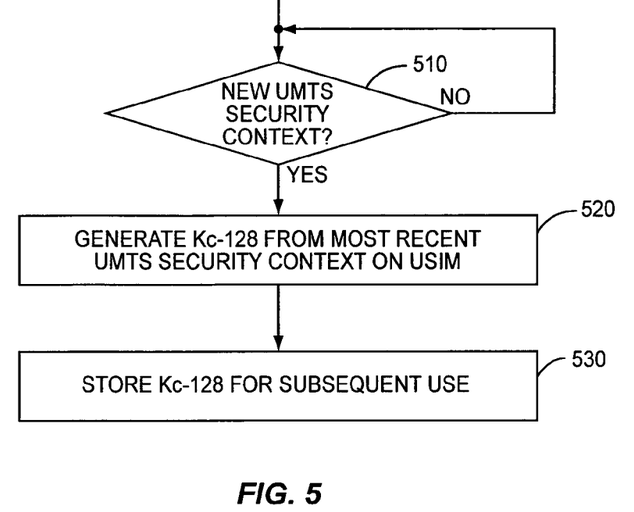
FIG. 5 is another process flow diagram illustrating a method for handling ciphering keys, in which the Kc-128 is derived in response to determining that a new UMTS security context has been established.

FIG. 5 illustrates a different approach. In this case, the generation of the Kc-128 for a given domain is triggered by the successful completion of a UMTS AKA procedure for that domain. Again, the illustrated approach is applicable to either or both of the circuit-switched and packet-switched domains. As shown at block 510, then, the procedure begins with a determination that a new UMTS security context exists. If so, then a Kc-128 is generated from the most recent UMTS security context on the USIM, as shown at block 520. This Kc-128 is stored on the ME, in association with the corresponding CKSN, for subsequent use in ciphering operations.

Figure 6:
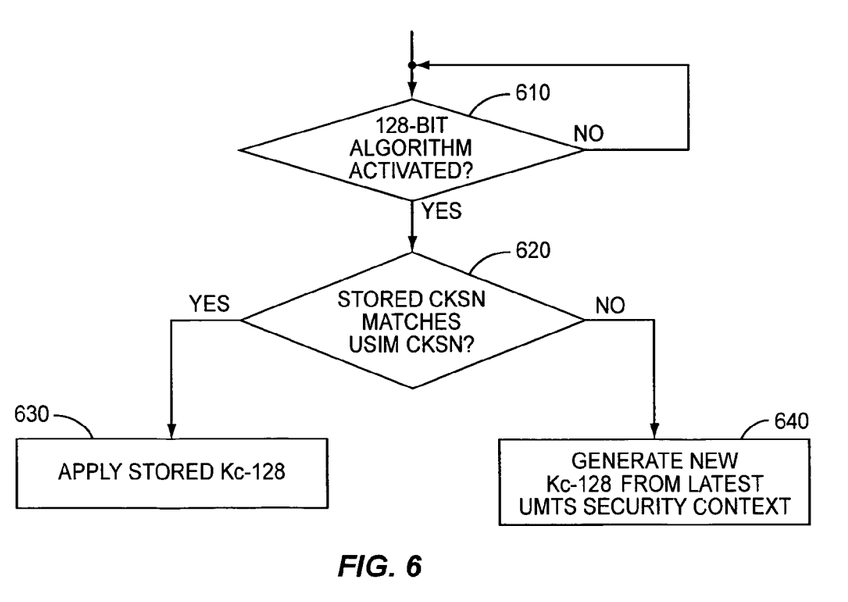
FIG. 6 is another process flow diagram illustrating another method for handling ciphering keys.

MEs that use the approach of FIG. 5 will generally have a stored Kc-128 on the ME. Upon activation of a 128-bit ciphering algorithm, the ME must take care to ensure that the stored Kc-128 is up to date. FIG. 6 illustrates one possible method for verifying the validity of the stored Kc-128. As shown at block 610, the procedure begins with the determination that a 128-bit algorithm is being taken into use. If so, then the stored CKSN for the appropriate domain is compared with the most recent CKSN, which is obtained from the USIM. This is shown at block 620. If these values match, then the stored Kc-128 is valid, and can be applied to the indicated ciphering algorithm, as shown at block 630. Otherwise, as indicated at block 640, a new Kc-128 must be generated from the latest UMTS security context, existing on the USIM.

Special consideration should be given to ensuring that an ME is using the appropriate key after inter-system handovers to A/Gb mode. There are several possible handovers that should be considered. For instance, in the circuit-switched domain, after an inter-system change from Iu mode to A/Gb mode, when an A5/4 algorithm is taken into use that requires a 128-bit ciphering key then the ME shall apply the Kc-128 bit ciphering key (for the circuit-switched domain) derived by the ME from the UMTS security keys from the latest successful authentication procedure. Similarly, in the packet-switched domain, after an inter-system change from Iu mode to A/Gb mode, when a GEA algorithm is taken into use that requires a 128-bit ciphering key then the ME must also take care to apply the Kc-128 bit ciphering key (for GPRS) derived by the ME from the UMTS security keys from the latest successful authentication procedure. In either case, this may be done in several ways, such as by generating a new Kc-128 upon activation of the 128-bit ciphering algorithm (e.g., as shown in FIG. 4) or by verifying that the stored Kc-128 corresponds to the latest successful UMTS AKA procedure (e.g., as shown in FIG. 6).

In the circuit-switched domain, a Single Radio Voice Call Continuity (SR-VCC) handover from Iu mode to A/Gb mode must also be considered. Those skilled in the art will recognize that this is something of a special case, since this handover represents a transition from a packet-switched voice call to a circuit-switched voice call. After such a handover, if an A5 algorithm is taken into use that requires a 128-bit ciphering key then the ME shall use the derived UMTS security keys CK' and IK' for the circuit-switched domain (derived from the CK and IK in use in the packet-switched domain at the time of the handover) to derive a Kc-128 bit ciphering key for CS domain. The security keys CK' and IK' for the circuit-switched domain are derived in the same manner currently specified for generating Kc-64 after a SR-VCC handover; the derived CK' and IK' are used to generate the circuit-switched Kc-128 using the key derivation function specified in 3GPP TS 33.102. After that, the ME shall apply the new derived Kc-128 bit ciphering key for CS domain.

In the packet-switched domain, the case of inter-system change from S1 mode to A/Gb mode must also be considered. In this scenario the ME's behavior depends on whether the inter-system change occurs in connected mode or in idle mode, and if in idle mode whether the TIN variable indicates "GUTI" or "RAT-related TMSI."

In connected mode, or in idle mode when the TIN variable indicates "GUTI," then if a GEA algorithm is taken into use that requires a 128-bit ciphering key, the ME shall apply the Kc-128 bit ciphering key for GPRS derived by the ME from the new derived UMTS security keys. Note that at inter-system change from S1 to A/Gb mode in connected mode or in idle mode when the TIN variable indicates "GUTI", the ME always derives new UMTS, security keys for GPRS from the EPS security context. (See 3GPP TS 33.401.)

In idle mode, when the TIN variable indicates "RAT-related TMSI," then if a GEA algorithm is taken into use that requires a 128-bit ciphering key, the ME shall apply the Kc-128 bit ciphering key for GPRS derived by the ME from the UMTS security keys from the latest successful authentication procedure.

In the packet-switched domain, another consideration stems from the fact that an authentication and ciphering procedure may be used by the network in A/Gb mode to enable encryption (ciphering) without any new authentication and key agreement (AKA). Therefore in the context of the Kc-128 bit ciphering key for GPRS:

if an 64-bit ciphering algorithm is in use and a switch to a 128-bit algorithm is indicated, this means that the UE is using the latest UMTS security context for GPRS, and then the Kc-128 bit ciphering key for GPRS to apply is derived from the same UMTS security context for GPRS currently in use. Thus, the currently stored Kc-128 may be used, as it is derived from the same context from which the currently used Kc-64 key for GPRS was derived;

if an authentication (UMTS AKA) has taken place (producing a new UMTS security context in the USIM) and ciphering is disabled, and then later ciphering is enabled by means of an authentication and ciphering procedure without a new authentication taking place, then the ME has to derive the Kc-128 bit ciphering key for GPRS from the UMTS security context for GPRS stored in USIM.

In view of the preceding considerations, then, some MEs are configured to carry out the following procedure for determining which Kc-128 to use in A/Gb mode. In A/Gb mode, when an established UMTS security context for GPRS exists, and if the network indicates in the AUTHENTICATION AND CIPHERING REQUEST message to the ME that a GEA ciphering algorithm that requires a 128-bit ciphering key shall be taken into use, then the ME shall take the following actions:

if authentication is not requested and a GEA ciphering algorithm that requires 64-bit ciphering key is in use, the Me shall take into use the Kc-128 bit ciphering key for GPRS derived by the ME from the GPRS UMTS ciphering key and GPRS UMTS integrity key of the established UMTS security context in use before the AUTHENTICATION AND CIPHERING RESPONSE message is transmitted;

if authentication is not requested and a GEA ciphering algorithm that requires 128-bit ciphering key is in use, the Kc-128 bit ciphering key for GPRS of the established UMTS security context in use still applies;

otherwise, the ME shall take into use the Kc-128 bit ciphering key for GPRS derived by the ME from the CK and IK provided by the USIM during the latest successful authentication procedure before the AUTHENTICATION AND CIPHERING RESPONSE message is transmitted.

Finally, the addition of 128-bit ciphering capability to A/Gb mode requires modifications to the Logical Link Control layer in the ME. In particular, at least three modifications are needed. First, the GMM entity in the ME should be modified to either indicate to LLC which ciphering key to use (the Kc-64 ciphering key or the Kc-128 ciphering key), or to provide the appropriate ciphering key directly to LLC. Thus, the primitives LLGMM-ASSIGN and LLGMM-PSHO should be modified so they can indicate a Kc-64 bit or a Kc-128 ciphering key or carry a Kc-64 bit or a Kc-128 ciphering key. At present, only Kc-64 is considered. Second, the Input Offset Value (IOV), which is an LLC layer parameter used for ciphering, shall be modified so the rules applying to default IOV values also consider the case of a Kc-128 ciphering key. Again, at present, only Kc-64 is considered. Finally, the ciphering algorithm must be modified so the input parameter can be not only a Kc-64 ciphering key, but also a Kc-128 ciphering key.

As suggested above, some MEs according to the current invention may be configured to store two Kc-128 for the circuit-switched domain or for the packet-switched domain, or both. For instance, one stored Kc-128 ciphering key for the circuit-switched is for current use in encryption, while the other corresponds to the latest UMTS AKA procedure, but is not activated or in use yet. The same may be true for the GPRS Kc-128. In these embodiments, the ME needs to keep track of which stored Kc-128 is the one derived from the latest successful authentication procedure for proper operation. When a Kc-128 is derived from a new UMTS security context, the old key stored and designated as corresponding to the latest UMTS security context should be overwritten with the newly derived key. Likewise, when a Kc-128 is taken into use for the first time for a 128-bit ciphering algorithm, the stored Kc-128 designated as corresponding to the active Kc-128 should be overwritten with the key just taken into use.

The techniques described herein are generally implemented in one or more processing circuits in an ME, such as the processing circuits 120 pictured in the ME 105 of FIG. 1. In some embodiments, processing circuits 120 comprise one or several microprocessors, digital signal processors, and the like, as well as other digital hardware and digital memory. The memory in turn may comprise one or several types of memory such as read-only memory (ROM), random-access memory, cache memory, flash memory devices, optical storage devices, etc., and is configured to store program code for executing one or more telecommunications and/or data communications protocols and for carrying out one or more of the key handling techniques described herein. The memory further stores program data and user data received from the wireless base station and to be transmitted to the base station, and may further store various parameters, pre-determined threshold values, and/or other program data for controlling the operation of the mobile station. Mobile equipment 105 obviously includes various other features that are not shown, such as user interface circuitry, positioning circuits, and the like. However, these features are well known to those skilled in the art and are therefore not illustrated.

Examples of several embodiments of the present invention have been described in detail above, with reference to the attached illustrations of specific embodiments. Because it is not possible, of course, to describe every conceivable combination of components or techniques, those skilled in the art will appreciate that the present invention may be implemented in other ways than those specifically set forth herein, without departing from essential characteristics of the invention. The present embodiments are thus to be considered in all respects as illustrative and not restrictive, and all modifications and variations that fall within the scope of the appended claims are intended to be embraced therein.

What is claimed is:

1. A method for handling, ciphering keys in a mobile station comprising a mobile equipment (ME) and a Universal Subscriber Identity Module (USIM), the method comprising:
    obtaining, by a processing circuit, a Universal Mobile Telecommunications System (UMTS) cipher key (CK), a UMTS integrity key (IK), and a UMTS ciphering key sequence number (CKSN) from the USIM;
    generating, by the processing circuit, a 128-bit ciphering key (Kc-128) from the UMTS CK and the UMTS IK;
    storing, by the processing circuit, the Kc-128 and the UMTS CKSN on the mobile equipment, separate from the USIM, wherein the stored UMTS CKSN is associated with the stored Kc-128;
    determining, by the processing circuit, that a ciphering algorithm requiring a 128-bit ciphering key is to be taken into use for operation in one of a packet-switched domain and a circuit-switched domain;
    prior to applying the stored Kc-128 to the ciphering algorithm, verifying a validity of the stored Kc-128 by:
        obtaining, by the processing circuit, a most recent UMTS CKSN from the USIM; and
        comparing the most recent UMTS CKSN to the stored UMTS CKSN to verify a match; and
    applying, by the processing circuit, the stored Kc-128 to the ciphering algorithm responsive to verifying the validity of the Kc-128.

2. The method of claim 1 wherein the UMTS CK and the UMTS IK are for operation in the packet-switched domain.

3. The method of claim 1 wherein the UMTS CK and the UMTS IK are for operation in the circuit-switched domain.

4. The method of claim 3:
    wherein said obtaining, generating, and storing are performed by the processing circuit in response to said determining.

5. The method of claim 1:
    further comprising determining, by the processing circuit, that a new UMTS security context has been established;
    wherein said obtaining, generating, and storing are performed by the processing circuit in response to said determining.

6. The method of claim 1:
    further comprising determining, by the processing circuit, that the USIM has generated a 64-bit ciphering key;
    wherein said obtaining, generating, and storing are performed by the processing circuit in response to said determining.

7. The method of claim 1 further comprising:
    determining, by the processing circuit, that a ciphering algorithm requiring a 128-bit ciphering key is to be taken into use;
    obtaining, by the processing circuit, a most recent UMTS CKSN from the USIM and comparing the most recent UMTS CKSN to the stored UMTS CKSN;
    in response to determining that the most recent UMTS CKSN does not match the stored CKSN:
        obtaining, by the processing circuit, a new UMTS CK, new UMTS IK, and new UMTS CKSN from the USIM;
        generating, by the processing circuit, a new Kc-128 from the new UMTS CK and the new UMTS IK;
        storing, by the processing circuit, the new Kc-128 and the new UMTS CKSN on the mobile equipment.

8. The method of claim 1 further comprising:
    obtaining, by the processing circuit, a new CK, new UMTS IK, and new UMTS CKSN from the USIM;
    generating, by the processing circuit, a new Kc-128 from the new UMTS CK and the new UMTS IK;
    storing, by the processing circuit, the new Kc-128 and the new UMTS CKSN on the mobile equipment, in addition to the previously stored Kc-128 and UMTS CKSN.

9. The method of claim 8 further comprising:
    determining, by the processing circuit, whether ciphering algorithm requiring a 128-bit ciphering key is to be activated;

in response to determining that the ciphering algorithm requiring a 128-bit ciphering key is to be activated, overwriting the previously stored Kc-128 and UMTS CKSN with the new Kc-128 and new UMTS CKSN.

10. The method of claim 1 further comprising deleting the stored Kc-128 in response to determining that the stored Kc-128 is invalid.

11. The method of claim 10 wherein determining, by the processing circuit, whether the stored Kc-128 is invalid comprises at least one of:
   detecting, by the processing circuit, that the corresponding UMTS CKSN on the USIM has been or is to be deleted;
   detecting, by the processing circuit, that an update status on USIM for circuit-switched services is changed to "U2 NOT UPDATED," "U3 ROAMING NOT ALLOWED," or "U4UPDATING DISABLED";
   detecting, by the processing circuit, that an update status on USIM for packet-switched services is changed to "GU2 NOT UPDATED" or "GU3 ROAMING NOT ALLOWED";
   detecting, by the processing circuit, that the USIM has been disabled.

12. A mobile station, comprising:
   a Universal Subscriber Identity Module (USIM); and
   a mobile equipment (ME) coupled to the USIM via a USIM interface:
   wherein the ME comprises one or more processing circuits configured to:
      obtain a Universal Mobile Telecommunications System (UMTS) cipher key (CK), a UMTS integrity key (IK), and a UMTS ciphering key sequence number (CKSN) from the USIM;
      generate a 128-bit ciphering key (Kc-128) from the UMTS CK and the UMTS IK;
      store the Kc-128 and the CKSN on the mobile equipment, separate from the USIM, wherein the stored UMTS CKSN is associated with the stored Kc-128;
      determine that a ciphering algorithm requiring a 128-bit ciphering key is to be taken into use for operation in one of a packet-switched domain and a circuit-switched domain;
      prior to applying the stored Kc-128 to the ciphering algorithm, verify a validity of the stored Kc-128 by:
         obtaining a most recent UMTS CKSN from the USIM; and
         comparing the most recent UMTS CKSN to the stored UMTS CKSN to verify a match; and
      responsive to verifying the validity of the stored Kc-128, apply the stored Kc-128 to the ciphering algorithm.

13. The mobile station of claim 12 wherein the UMTS CK and the UMTS IK are for operation in the packet-switched domain.

14. The mobile station of claim 12 wherein the UMTS CK and the UMTS IK are for operation in the circuit-switched domain.

15. The mobile station of claim 14 wherein, in response to said determining, the one or more processing circuits are further configured to:
   obtain the UMTS CK, the UMTS IK, and the UMTS CKSN from the USIM;
   generate the Kc-128 from the UMTS CK and the UMTS IK; and
   store the Kc-128 and the CKSN on the mobile equipment separate from the USIM.

16. The mobile station of claim 12 wherein, in response to said determining, the one or more processing circuits are further configured to:
   determine that a new UMTS security context has been established;
   obtain the UMTS CK, the UMTS IK, and the UMTS CKSN from the USIM;
   generate the Kc-128 from the UMTS CK and the UMTS IK; and
   store the Kc-128 and the CKSN on the mobile equipment separate from the USIM.

17. The mobile station of claim 12 wherein, in response to said determining, the one or more processing circuits are further configured to:
   determine that the USIM has generated a 64-bit ciphering key (Kc-64);
   obtain the UMTS CK, the UMTS IK, and the UMTS CKSN from the USIM;
   generate the Kc-128 from the UMTS CK and the UMTS IK; and
   store the Kc-128 and the CKSN on the mobile equipment separate from the USIM.

18. The mobile station of claim 12 wherein, in response to determining that the most recent UMTS CKSN does not match the stored UMTS CKSN, the one or more processing circuits are further configured to:
   obtain a new UMTS CK, new UMTS IK, and new UMTS CKSN from the USIM;
   generate a new Kc-128 from the new UMTS CK and the new UMTS IK;
   store the new Kc-128 and the new UMTS CKSN on the mobile equipment.

19. The mobile station of claim 12 wherein the one or more processing circuits are further configured to:
   obtain a new UMTS CK, new UMTS IK, and new UMTS CKSN from the USIM;
   generate a new Kc-128 from the new UMTS CK and the new UMTS IK;
   store the new Kc-128 and the new UMTS CKSN on the mobile equipment, in addition to the previously stored Kc-128 and UMTS CKSN.

20. The mobile station of claim 19 wherein the one or more processing circuits are further configured to:
   determine whether a ciphering algorithm requiring a 128-bit ciphering key is to be activated;
   in response to determining that the ciphering algorithm requiring a 128-bit ciphering key is to be activated, overwrite the previously stored Kc-128 and UMTS CKSN with the new Kc-128and new UMTS CKSN.

21. The mobile station of claim 12 wherein, in response to determining that the stored Kc-128 is invalid, the one or more processing circuits are further configured to delete the stored Kc-128.

22. The mobile station of claim 21 wherein the one or more processing circuits are configured to determine whether the stored Kc-128 is invalid by performing at least one of:
   detecting that the corresponding UMTS CKSN on the USIM has been or is to be deleted;
   detecting that an update status on USIM for circuit-switched services is changed to "U2 NOT UPDATED," "U3 ROAMING NOT ALLOWED," or "U4 UPDATING DISABLED";
   detecting that an update status on USIM for packet-switched services is changed to "GU2NOT UPDATED" or "GU3 ROAMING NOT ALLOWED";

detecting that the USIM has been disabled.

* * * * *

UNITED STATES PATENT AND TRADEMARK OFFICE
CERTIFICATE OF CORRECTION

PATENT NO. : 9,681,292 B2
APPLICATION NO. : 13/388890
DATED : June 13, 2017
INVENTOR(S) : Verón et al.

It is certified that error appears in the above-identified patent and that said Letters Patent is hereby corrected as shown below:

On the Title Page

On Page 2, in Item (56), under "U.S. PATENT DOCUMENTS", in Column 1, Line 3, delete "Suen" and insert -- Suen et al. --, therefor.

On Page 2, in Item (56), under "U.S. PATENT DOCUMENTS", in Column 1, Line 5, delete "Zhu" and insert -- Zhu et al. --, therefor.

On Page 2, in Item (56), under "U.S. PATENT DOCUMENTS", in Column 1, Line 8, delete "Zhang" and insert -- Zhang et al. --, therefor.

On Page 2, in Item (56), under "U.S. PATENT DOCUMENTS", in Column 1, Line 10, delete "Brusilovsky" and insert -- Brusilovsky et al. --, therefor.

In the Drawings

In Fig. 7, Sheet 4 of 4, delete "[AUTN]" and insert -- AUTN --, therefor.

In the Specification

In Column 1, Line 22, delete "3$^{rd}$-Generation" and insert -- 3$^{rd}$ Generation --, therefor.

In Column 3, Line 2, delete "drawings" and insert -- drawings. --, therefor.

In Column 6, Line 39, delete "Ciphering" and insert -- ciphering --, therefor.

In Column 7, Line 51, delete "TIN" and insert -- TIN --, therefor.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,681,292 B2

In Column 7, Line 53, delete "TlN" and insert -- TIN --, therefor.

In Column 7, Line 59, delete "TlN" and insert -- TIN --, therefor.

In Column 7, Line 60, delete "UMTS," and insert -- UMTS --, therefor.

In Column 7, Line 62, delete "TlN" and insert -- TIN --, therefor.

In the Claims

In Column 9, Line 58, in Claim 1, delete "handling," and insert -- handling --, therefor.

In Column 11, Line 18, in Claim 11, delete ""U4UPDATING" and insert -- "U4 UPDATING --, therefor.

In Column 12, Line 50, in Claim 20, delete "Kc-128and" and insert -- Kc-128 and --, therefor.

In Column 12, Line 66, in Claim 22, delete ""GU2NOT" and insert -- "GU2 NOT --, therefor.